United States Patent Office.

HENRY BARTHOLOMAY, OF ROCHESTER, NEW YORK, ASSIGNOR TO BARTHOLOMAY & FRAUENBERGER, OF SAME PLACE.

Letters Patent No. 100,352, dated March 1, 1870.

IMPROVED METHOD OF PRESERVING THE AROMATIC PRINCIPLE OF HOPS.

The Schedule referred to in these Letters Patent and making part of the same.

*To all whom it may concern:*

Be it known that I, HENRY BARTHOLOMAY, of Rochester, in the county of Monroe, and State of New York, have invented a new and improved Method of Preserving the Aromatic Principle of Hops; and I do hereby declare that the following is a full, clear, and exact description of the same.

It is well known that hops kept from one season to another lose their value to such an extent as to render them quite worthless as a marketable commodity, and especially is this the case when put up in bales in the usual manner, as they readily absorb moisture, which produces heat, turns them black, and completely destroys the resinous, adhesive, and aromatic properties of the lupulin or flower of the hop. These properties in hops are affected by the slightest change in the temperature and condition of the air which absorbs or dissipates their valuable properties entirely.

For these reasons, I have found by experiment, that hops cannot be kept in a store-room or chamber connected with an ice-house, as has been heretofore proposed, so as to isolate them from the moisture produced by the ice. Moreover, I have found by experience that hops require to be examined occasionally, in order to ascertain if they are dry and in good condition; and for this reason it is impracticable to keep them in connection with a refrigerating-chamber in warm weather.

By my discovery, I am enabled to preserve the aromatic principle of hops, as well as to retain their fresh yellow color from one season to another, so that they will be of as great commercial value in the hot or summer season, and from one season to another, as when they were first cured.

On account of this uncertainty of preserving hops in warm weather, good lager beer can and has only been made in the winter season and stored away in great quantities. To preserve hops, therefore, so that they can be used in the summer season, is a matter of great commercial importance. This I effect by utilizing the old beer-casks or barrels which are used in ale-breweries for storing beer, holding in quantity, from twelve to thirty barrels of the ordinary size, and which are provided with a door or man-hole, through which admission is gained to the interior of the barrel, for the purpose of cleaning it when necessary. These barrels I first make perfectly dry, by burning sulphur in them, so as to absorb every particle of dampness, and care must be taken that they have been empty a sufficient length of time to render the staves and heads perfectly dry. They are then tarred all over their interior surfaces, so as to form a glutinous coating, which, when dry, becomes perfectly hard and smooth, and renders the barrels impervious to air and dampness. These large barrels, thus prepared, are ready for the reception of the hops, which are usually pressed and packed in square bales weighing about two hundred pounds. The usual canvas or sack of the bale is then removed, and the hops are cut up by a sharp instrument, into pieces of a size to be admitted through the man-hole of the barrel, and a man or boy gets into the barrel and packs these pieces so cut, snugly and closely away, until it is well filled.

When the barrel is thus filled, the door is inserted, so as to close the man-hole, a packing of any suitable material being used to close the joint of the door tightly.

The bung with which these barrels are always provided is then removed, and an opening is made through the entire body of the hops in the barrel by means of an iron bar inserted through the bung-hole. Into the opening thus made through the hops, a piece of burning sulphur is inserted by means of a hook, such as is used in all breweries. After the burning of the sulphur, the hook is removed, and the bung, with a suitable packing around it, driven tightly into the hole, so that the barrel is then hermetically sealed.

The burning of the sulphur absorbs all the moisture that may remain in the barrel while packing the hops and perfectly preserves their rich yellow color, while the use of the tar as a coating for the interior of the barrel, adds greatly to the richness of the flavor of the hops, whether they are used medicinally or for making beer.

I have, by experiment, in this way kept hops from one season to another, and have found that their flavor and quality is as perfectly preserved as when first packed, and this without any costly structure of air-tight rooms or compartments with a contiguous refrigerating-chamber, as the barrels are found ready made at every brewery, and being made of heavy thick staves, only require to be kept in a cool cellar, to perfectly preserve the hops.

In cold weather, these barrels may be kept in any convenient dry place, and the hops may be removed therefrom from time to time, and the barrels used again, either for the storing of beer or the preservation of hops from one season to another. Care must be taken, however, every time the barrel is opened and closed, to remove the bung-hole and burn a small lump of sulphur therein, as at first described.

Having described my invention,

I claim—

1. The improved mode of preserving the aromatic principle of hops, as herein described.

2. The use of tar and sulphur combined, in a hermetically sealed barrel or its equivalent, for preserving the aromatic principle and color of hops from one season to another, as described.

HENRY BARTHOLOMAY.

Witnesses:
GEO. FRAUENBERGER,
H. HOFHEINZ.